(No Model.)
P. K. SOMMER.
VITRIFICATION FURNACE.
No. 509,257. Patented Nov. 21, 1893.
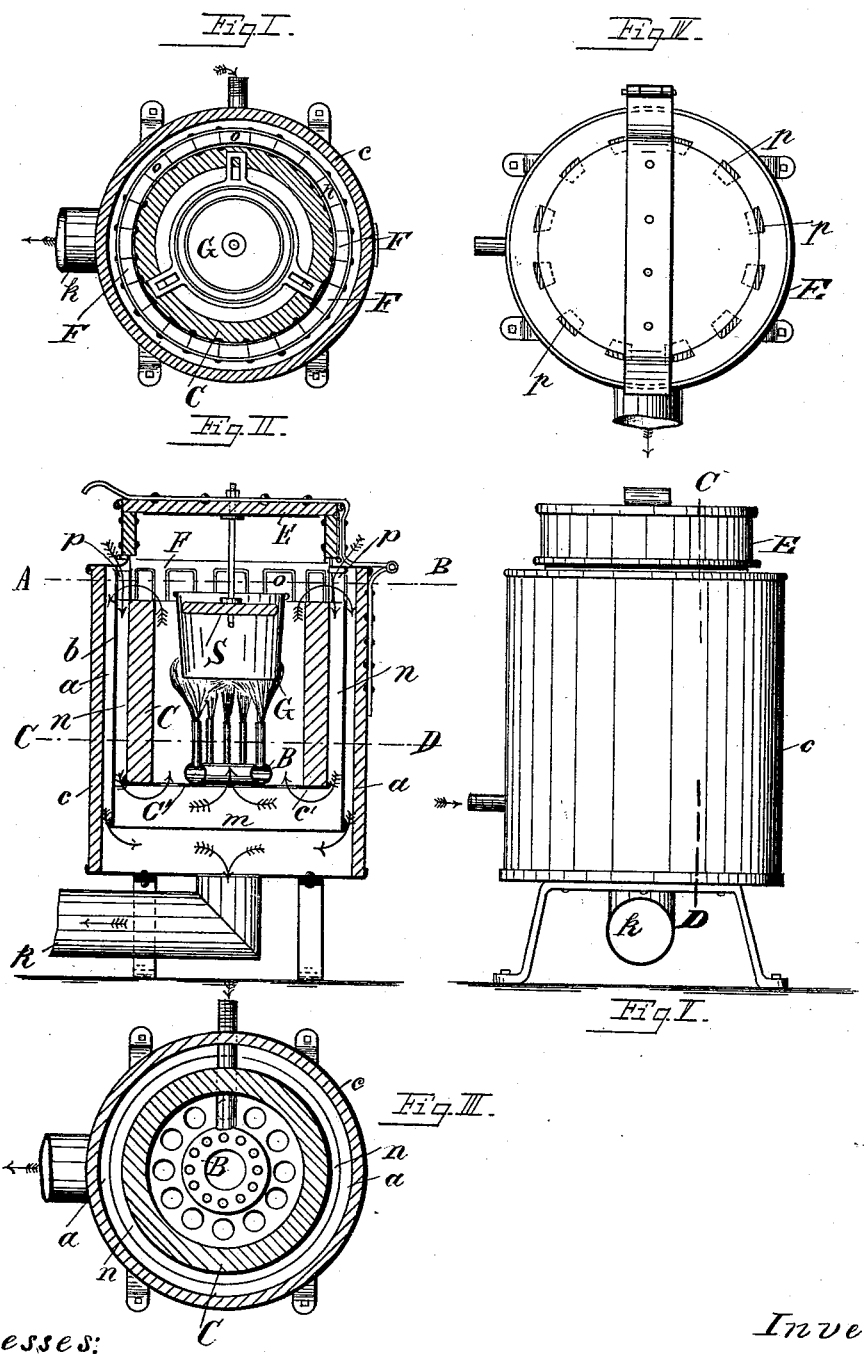
Witnesses:
C. Sedgwick
E. M. Clark
Inventor
P. K. Sommer
by Munn & Co.
Attorneys

UNITED STATES PATENT OFFICE.

PETER KARL SOMMER, OF MANNHEIM, GERMANY, ASSIGNOR TO DANIEL KEGLER, OF SAME PLACE.

VITRIFICATION-FURNACE.

SPECIFICATION forming part of Letters Patent No. 509,257, dated November 21, 1893.

Application filed June 11, 1891. Serial No. 395,958. (No model.)

*To all whom it may concern:*

Be it known that I, PETER KARL SOMMER, tinman, of Mannheim, in the Grand Duchy of Baden and German Empire, have invented new and useful Improvements in Vitrification-Furnaces, of which the following is a specification, reference being had therein to the accompanying drawings.

This invention relates to a furnace for the enameling of the bottoms of cooking vessels. In such cooking vessels after continued use the bottoms are generally burned through while the sides or walls are still in good condition. By this invention new bottoms are inserted and enameled so that such cooking vessels are equal to new.

The invention consists of a specially constructed furnace for the application of intense heat not only to the bottom to be enameled, but to the sides of the vessel also, so that the enamel on the sides will be fused and combine with the fresh enamel and form one continuous coating.

Cooking vessels repaired according to this invention are therefore rendered equal to new as regards quality and appearance. The expense of such repairs is small as compared with the cost of new vessels, and this invention is therefore designed to meet a long felt want. The furnace used for the purpose of enameling is illustrated in the accompanying drawings.

Figure I is a horizontal section of my enameling furnace on the line A, B, (Fig. II.) Fig. II is a longitudinal section on the line C, D, (Fig. V.) Fig. III is a horizontal section on the line C, D, in Fig. II. Fig. IV is a plan of the cover; and Fig. V is an elevation of the furnace.

The furnace consists of an outer cylindrical wall $c$ lined with fire brick, and an interior sheet metal cylinder C also lined with fire brick, the latter cylinder surrounding the furnace and receiving the vessel to be enameled. Between the outer wall or cylinder $c$ and the inner cylinder C is arranged a sheet metal mantle $b$ with a bottom $m$ forming two air channels $a$ and $n$, and serving to heat the secondary air required for producing the intense gas flame. At the bottom of the furnace is arranged a pipe $k$ for carrying off the products of combustion; at the top is arranged a cover E and within the cylinder C is arranged a ring of burners B receiving the mixture of air and gas which issues through the burners. The space within the cylinder C is separated from the air space $a$ by the ring F, arranged at the top of the cylinder C said ring having rectangular channels $o$, which extend through the space $n$ to the outer space $a$ so that the gases of combustion escaping from the cylinder pass through such openings $o$ into the outer space $a$ where they heat the secondary air entering the annular space $n$. The gases of combustion escape ultimately through the pipe $k$ in the direction of the arrow.

The furnace is operated as follows:—The vessel G is suspended in the cylinder C. Below the vessel, are arranged the burners B into which is introduced the gas mixed in suitable proportions with compressed air under a hydrostatic pressure of about thirty millimeters, and which is ignited at the issue orifices of the burner tubes, that is to say directly under the bottom of the vessel to be enameled. As such heat would not be sufficient for melting the enamel the necessary secondary air must be heated to a very large degree before combustion. This is effected by the gases of combustion circulating around the suspended vessel and escaping then through the openings $o$ into the outer space $a$ between the cylinder $c$ and the mantle $b$; from the space they escape through the pipe $k$. The cold secondary air comes from outside through the openings $p$ provided in the outside shell of the cover E between the openings $o$. Through these openings $p$ the outside air enters the second annular space $n$ and passes along the walls which are heated by means of the escaping gases of combustion; from this annular space the heated air travels to the burner B. The radiation of the heat is prevented by asbestus covering with which the cylinder $c$ and the cover E are provided. An asbestus disk S, is provided in the vessel to be enameled to prevent the heat escaping from its bottom.

What I claim, and desire to secure by Letters Patent of the United States, is—

1. A furnace for enameling and similar purposes, comprising a set of gas burners, an inner burning chamber lined with refractory material, an outer cylinder around the inner chamber for the combustion gases, and a second outer chamber for the air going to the gas burners, substantially as described.

2. An enameling furnace, comprising an inner and outer casing having two channels in the space between them, one of the channels communicating with the top and the other the bottom of the inner casing, and a burner within the inner casing substantially as and for the purpose set forth.

3. An enameling furnace, comprising an outer wall, a cylinder within the wall, and a partition or mantle in the space between the wall and cylinder and dividing the said space into two channels, one of which communicates with the top of the cylinder and the smoke pipe and the other with the bottom of said cylinder, and with the outer air, and a burner within the inner casing substantially as described.

4. An enameling furnace, comprising an outer wall or casing provided with a pipe for the escape of the products of combustion leading from its bottom, a cylinder in the wall or casing, burners in said cylinder, and a mantle arranged in the space between the wall or casing and cylinder and provided with a bottom, said mantle dividing the space into two channels one of which communicates with the top of the cylinder and with the pipe of the outer wall or casing and the other with the outer air at the top and with the bottom of said cylinder, substantially as herein shown and described.

5. In an enameling furnace of the character described, the combination with the outer wall or casing, and the cylinder therein, of an asbestus disk suspended in the cylinder and adapted to enter the vessel to be enameled, substantially as and for the purpose specified.

In witness whereof I have hereunto set my hand in presence of two witnesses.

PETER KARL SOMMER.

Witnesses:
W. H. EDWARDS,
W. HAUPT.